(12) United States Patent
Stolt

(10) Patent No.: US 6,470,193 B1
(45) Date of Patent: *Oct. 22, 2002

(54) POWER EFFICIENT INDOOR RADIO BASE STATION

(75) Inventor: Tomas Nils Stolt, Stockholm (SE)

(73) Assignee: Telefonaktiebolaget L M Ericsson (publ), Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/843,006

(22) Filed: Apr. 11, 1997

(51) Int. Cl.[7] .............................. H04B 1/38; H04B 1/02; H04L 27/04
(52) U.S. Cl. .................... 455/562; 455/101; 455/103; 375/299
(58) Field of Search .................. 455/522, 574, 455/101, 103, 105, 560, 561, 562; 375/299; 343/797

(56) References Cited

U.S. PATENT DOCUMENTS

| | | | |
|---|---|---|---|
| 4,051,474 A | * 9/1977 | Mack et al. ............... | 342/362 |
| 4,144,496 A | * 3/1979 | Cunningham et al. ....... | 455/562 |
| 4,146,893 A | * 3/1979 | Inagaki et al. ............ | 342/353 |
| 4,198,641 A | * 4/1980 | Gibson ................... | 343/797 |
| 4,446,465 A | * 5/1984 | Donovan ................. | 343/797 |
| 5,287,116 A | * 2/1994 | Iwasaki et al. ........... | 343/853 |
| 5,568,088 A | 10/1996 | Dent et al. | |
| 5,602,555 A | * 2/1997 | Searle et al. ............. | 455/562 |
| 5,633,645 A | * 5/1997 | Day ..................... | 343/700 |
| 5,724,666 A | * 3/1998 | Dent .................... | 455/562 |
| 5,732,324 A | * 3/1998 | Rieger, III .............. | 455/3.1 |
| 5,933,788 A | * 8/1999 | Faerber et al. ............ | 455/562 |
| 5,936,580 A | * 8/1999 | Van Puijenbroek ..... | 343/700 R |
| 6,275,704 B1 | * 8/2001 | Dixon ................... | 455/446 |

FOREIGN PATENT DOCUMENTS

| | | | |
|---|---|---|---|
| EP | 713259 | 5/1996 | |
| EP | 0 713 259 | * 5/1996 | ............. H01P/1/18 |
| GB | 2304496 | 3/1997 | |
| WO | WO95/34102 | 12/1995 | |

OTHER PUBLICATIONS

European Standard Search Report re RS 99342. Date of completion of search: Sep. 16, 1997.

* cited by examiner

*Primary Examiner*—Nguyen T. Vo
*Assistant Examiner*—Charles N. Appiah
(74) *Attorney, Agent, or Firm*—Burns, Doane, Swecker & Mathis, L.L.P.

(57) ABSTRACT

A power efficient indoor radio base station for use with wireless cellular telecommunication systems is disclosed. A small unitary package design is achieved by reducing the level of power dissipation, and subsequently, the size of the heat sink required for heat dissipation. In a preferred embodiment of the present invention, a plurality of transmitter signals are combined in a hybrid combiner to generate a pair of output signals. A first output signal is transmitted through a dipole antenna resulting in vertical polarization and a second output signal is transmitted through a horizontal antenna producing horizontal polarization. Further, a phase shift of 90° is introduced between the signals prior to transmission. The resulting simultaneous transmission of the perpendicularly oriented signals yields a substantially circular polarized field in the area of coverage. Power dissipation is reduced by transmitting the horizontal polarized signal because it is converted to useful energy that would otherwise be dissipated in a load resistor.

15 Claims, 4 Drawing Sheets

POWER EFFICIENT INDOOR RADIO BASE STATION

FIELD OF INVENTION

The present invention relates generally to radio base stations used in wireless telecommunication systems. In particular, it pertains to a small low-heat dissipating radio base station that is especially suitable for indoor applications.

BACKGROUND OF THE INVENTION

The explosive growth in the wireless telecommunications industry has fueled the demand for a vast array of telecommunication services that are either currently being offered or planned for implementation. These services include traditional analog and digital cellular, and Personal Communication Services (PCS) that include voice, paging, data, and fax capabilities. By many indications, these services will become increasingly popular in the coming years leading, in all likelihood, to expectations of higher levels of service. For example, the ability to access these services from more and more locations becomes an increasingly important issue. Furthermore, the search for more revenue has service providers increasingly interested in being able to provide access to their services in areas that were previously inaccessible. For example, it would be desirable to provide coverage in previously untapped regions such as large indoor areas due to the lack of coverage from conventional outdoor equipment. Such regions may include hotel lobbies, subway stations, restaurants, convention and entertainment centers, office buildings and other situations where localized wireless coverage is required or where subscriber concentrations and call volumes are high.

In a cellular telecommunication system, a mobile switching center (MSC) is linked to a plurality of base stations that are geographically dispersed to form the area of coverage for the system. The radio base stations (RBS) are designated to cover specified areas, known as cells, in which two way radio communication can then take place between the mobile station (MS) and RBS in the coverage area. Although originally conceived for outdoor environments, this idea can be adapted to provide indoor coverage by installing radio base stations in these indoor areas. These RBSs are typically smaller than the outdoor variety and provide coverage by creating micro cells over the region.

Although performance of these indoor systems have been adequate, there are some drawbacks with the design of existing RBSs. For example, it is desirable to reduce the size of the indoor base stations further so that they would be much more unobtrusive and simpler to mount. Very small RBSs, in addition to enhancing aesthetics, allows for simplified mounting and reduces installation costs. For example, very small RBSs would be able to be mounted on existing structures, support beams, or mounted on a wall as opposed to requiring dedicated support structures or special mounting arrangements. One major factor that has inhibited reduction of RBSs to very small sizes has been the relatively large heat dissipating devices required for proper operation.

FIG. 1 shows a perspective view of a prior art Ericsson RBS 884 Micro Radio Base Station 10. Micro Base Station 10 was designed to provide localized coverage in the form of micro cells for indoor environments and is essentially a scaled-down version of base stations used outdoors. The interior components of Base Station 10 are housed in metal cabinet 12 measuring approximately 440 mm×310 mm×488 mm (17.2 in×12.2 in×19.2 in), the separately installed antennas are not shown. A disadvantage of this base station is that its size makes unobtrusive installation difficult and inconvenient. Further, the antenna structure must be mounted separately making installation more complex and expensive. Furthermore, the heat sink required for proper operation of the internal circuit components, which may include built-in fans, is the limiting factor in reducing the size of the base station. The operation and heat removal requirements of the internal circuit components of base station 10 are described herein.

FIG. 2 shows a functional block diagram of the Micro Base Station 10 of FIG. 1. The output of transmitter TX1 14 is combined with transmitter TX2 16 with a hybrid combiner 18. The output of combiner 18 yields two components: a component 19 which is subsequently used for transmission and component 21 which is not transmitted but terminated in load resistor 24. Load resistor 24, shown separately from combiner 18 for simplicity, provides matching impedance for combiner 18 to minimize reflections for increased transmission efficiency. After emerging from combiner 18, component 19 is sent to a duplex filter 20 and then is routed to a dipole antenna 22 for transmission through the air. The component 21, after emerging from combiner 18, is dissipated as heat in load resistor 24. Roughly half of the total power emerging from combiner 18 is sent on for transmission (component 19) and the other half is dissipated in load 24 (component 21). Therefore, a signal loss of approximately a little more than 3 dB is typically experienced due to combiner 18 and load resistor 24. Similarly, transmitter TX3 26 and transmitter TX4 28 are combined in hybrid combiner 30 where the transmitted component is sent to duplex filter 32 and then to antenna 34. Similarly, the non-transmitted component from combiner 30 is terminated in load 36 and dissipated as heat. By way of example, the combination of 400 mW signal from TX1 and 400 mW from TX2 into combiner 18 results in approximately 100 mW per carrier of power transmitted from antenna 22 and 400 mW dissipated in load 24 as heat. With a comparable figure of 400 mW requiring dissipation in load 36 from TX3 and TX4, it becomes apparent that a relatively sizable heat sinking capacity capable of dissipating at least 800 mW is required for proper operation.

In view of the foregoing, it is an objective of the present invention to provide a technique for reducing the amount of heat dissipation required while maintaining substantially the same coverage area as compared to a base station with a terminated load. Further, as will be described hereinafter, the present invention provides a method and apparatus for constructing an indoor multi-carrier radio base station that is small, unobtrusive, and simple to install.

SUMMARY OF THE INVENTION

Briefly described, and in accordance with multiple embodiments thereof, the invention provides a technique for reducing heat dissipation in indoor radio base stations. In a first embodiment of the invention, a low-heat dissipating radio base station is provided comprising first and second transmitters with their output signals coupled to and combined with a hybrid combiner. The combiner generates a first output combiner signal to be transmitted through a dipole antenna, which produces vertical polarization, and a second output combiner signal transmitted through a horizontal antenna producing horizontal polarization. Prior to transmission, the output combiner signals are shifted in phase by 90° with respect to each other by the combiner. The resulting transmission of the perpendicular oriented signals produces a substantially circular polarized field in the area of coverage. Alternatively, an elliptically polarized field may be produced by varying the magnitude and/or phase of the emitted signals.

In a method aspect of the present invention, a method of reducing the power dissipated, and subsequently the size, of a radio base station is disclosed. The method includes combining a pair of transmitter output signals with a hybrid combiner. The combiner generates a first combiner output signal and a second combiner output signal. A phase shift of 90° is introduced by the combiner between the output signals. The combiner output signals are arranged to be emitted from an antenna such that the orientation of the signals are perpendicularly oriented to form a substantially circular polarized field. The transmission of the circular polarized field eliminates the need for signal termination in a heat dissipating load thereby reducing heat dissipation in the base station.

The embodiments of the present invention provide an efficient low-power consuming unitary radio base station in a small, convenient package. The small package design facilitates simpler mounting for unobtrusive, aesthetically pleasing installation. Further, the circular polarized field provides improved reception at the receiving station in the field of coverage. These and other advantages of the present invention will become apparent upon reading the following detailed descriptions and studying the various figures of the drawings.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

Figure 1:
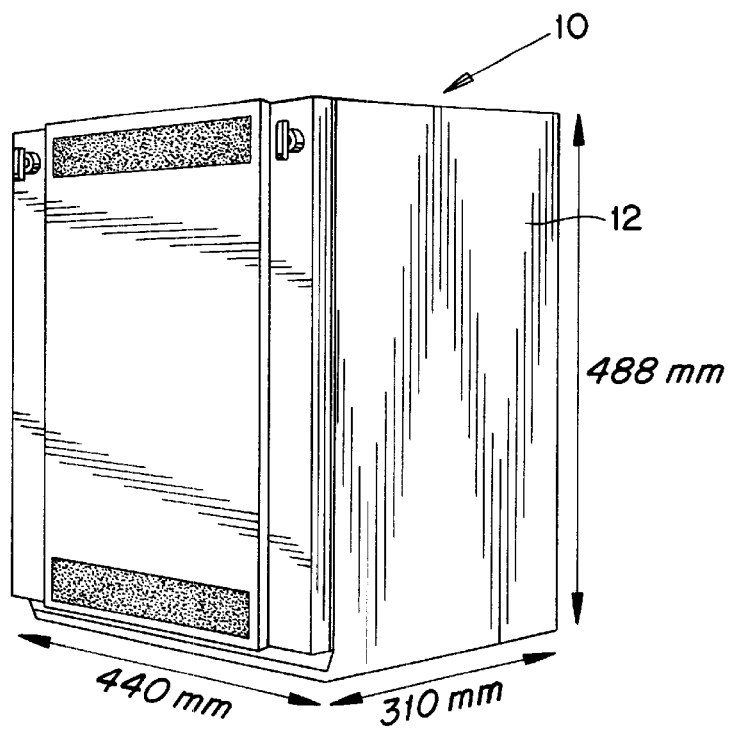
FIG. 1 is a perspective view of a prior art indoor base station.
Figure 2:
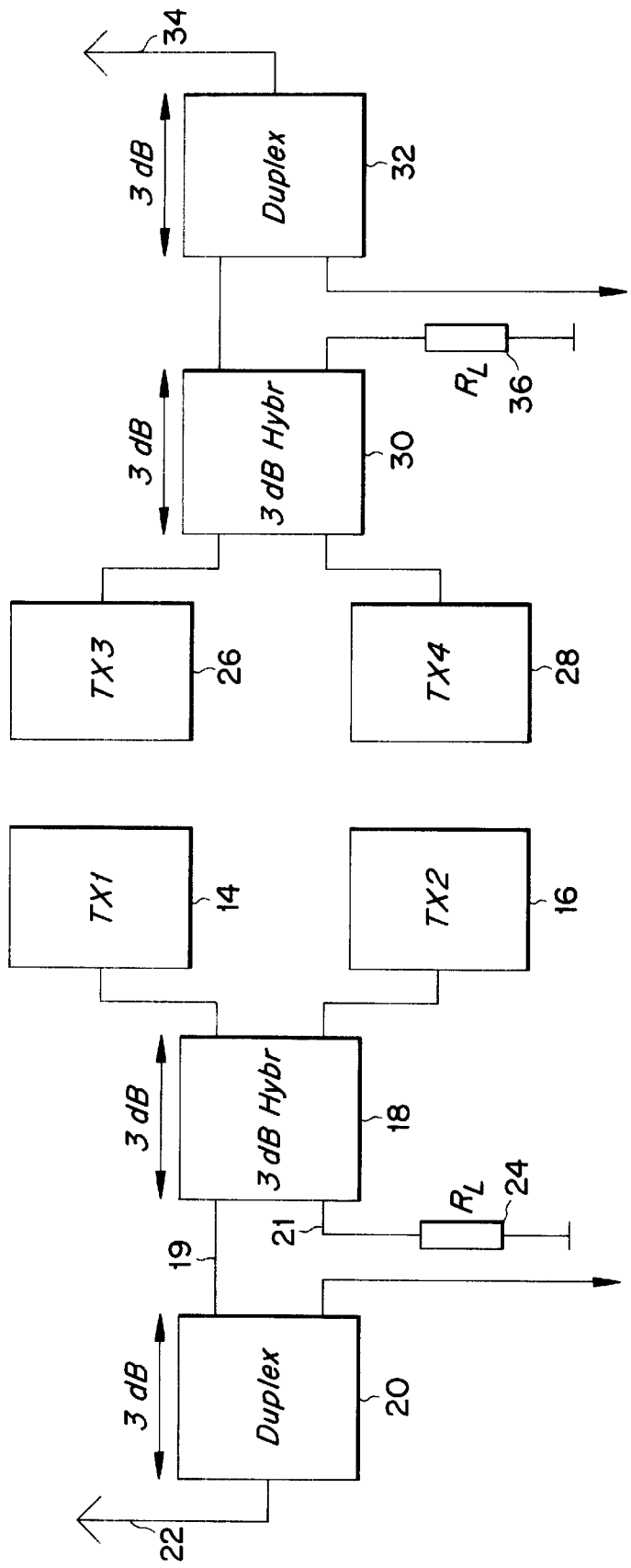
FIG. 2 is a functional block diagram of the indoor base station in FIG. 1.
Figure 3:
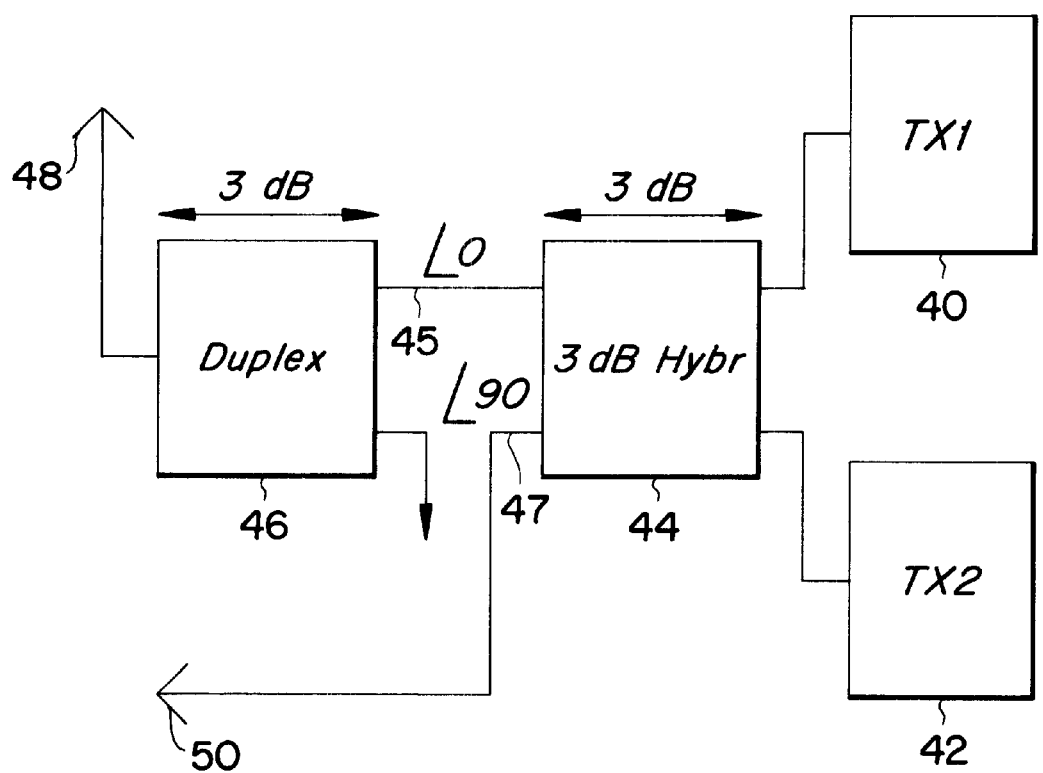
FIG. 3 is a functional block diagram of a base station in accordance with a first embodiment of the present invention.

A discussion of FIGS. 1 and 2 directed toward a prior art indoor radio base station was provided in the preceding sections. Referring now to FIG. 3, a simplified functional block diagram of a multi-carrier radio base station (RBS) is shown in accordance with a first embodiment of the present invention. For sake of simplicity, the receiving portions of the transceiver assemblies in the RBS have been omitted.

In cellular telecommunication systems, the transmitters operate at designated radio frequencies and are separated by a frequency distance as determined by a specified standard such as Advanced Mobile Phone Standard (AMPS). The power level of each of the output signals from transmitters TX1 40 and TX2 42 effectively determines the distance the signal is radiated or size of the coverage area. To make efficient use of a common antenna, signals from multiple transmitters are collected and routed to the antenna prior to transmission. A typical method used for collecting the transmitter output signals is by utilizing a combiner. In accordance with the first embodiment, a hybrid combiner 44, comprising a mixture of waveguides and passive electronics to achieve combination of the signals, is used. As those skilled in the art can appreciate, hybrid combiners are much smaller than the large cumbersome mechanical resonators used in the past, such as filter or cavity combiners. Further, hybrid combiners operate over a much broader range of frequencies and therefore do not require tuning. The drawback is that hybrid combiners are less efficient than mechanical resonators and typically cause losses of approximately a little more than 3 dB. This energy loss is radiated as heat imposing further demands on the heat dissipating system.

The combination of signals from TX1 40 and TX2 42 in the hybrid combiner 44 yields two components. Combiner 44 introduces a phase shift of 90° between the two components, in a procedure that is well known in the art. A first signal component 45 emerges from combiner 44 having a relative phase value of zero degrees and is subsequently sent to the duplex filter 46. Upon leaving the duplex filter, the signal is sent to dipole (vertical) antenna 48 for transmission, whereby the emitted signal has a vertically polarized orientation. Duplex filter 46 serves the purpose of separating the transmitted signals from the received signals so that a common antenna can be used. The relatively small duplex filters utilized in the illustrated embodiment have losses of approximately 3 dB. A second signal component 47 leaves combiner 44, having a phase shift of 90° with respect to the first signal component 45, and is sent to horizontal antenna 50 for transmission. The resulting emitted signal from antenna 50 has a horizontally polarized orientation. The input impedance of antenna 50 is chosen to be equivalent to the matching impedance of the combiner 44 to minimize signal reflections. In the prior art, the second component is unsuitable for transmission through a second vertical antenna because of interference between antennas of the same polarization that are in close proximity. This coupling between antennas causes undesirable signal distortion and degradation of field (destructive interference) which is well known to those in the art.

The simultaneous transmission of perpendicularly oriented signals, such as vertically and horizontally polarized signals, are theoretically uncoupled and thus do not interfere with each other. In practice, it has been found that some coupling exists but there is at least a 25–30 dB insulation between the vertical and horizontal antennas. The simultaneous transmission of vertical and horizontal oriented signals, of equal magnitudes with a phase difference of 90°, is known to those in the art as circular polarization. It should be apparent to those skilled in the art that circular polarization is a special case where the conditions of perpendicular orientation, equal magnitude, and phase 90° shift are met, and wherein variations of magnitude and/or phase will yield an elliptically polarized field. A major advantage of transmitting a circular polarized field from a radio base station (RBS) is that the second component output from the combiner, which is normally dissipated, is instead transmitted as useful energy. Therefore, increases in the overall efficiency of the RBS are realized since less energy is wasted. With increased efficiency, less output power is required of transmitters 40 and 42 to achieve the same or substantially similar coverage as in the prior art. This leads to even a further reduction in heat removal requirements for the system. Consequently, a much smaller heat sink is required thereby permitting the RBS unit to be much smaller.

Another advantage of emitting a circular polarized field is that mobile station (MS) reception is more robust. By way of example, the field produced by a dipole antenna is received by the MS reliably when the MS is positioned vertically i.e. the vertical antenna in the MS matches the orientation of the field. When the MS is moved out of the vertical plane, the signal starts to fade and reception becomes weaker. This is caused by the antenna of the MS moving into a null in the broadcast field. In contrast, an MS in a circular polarized field is capable of receiving the signal equally well in the vertical and horizontal planes and all planes in between. This increases the probability of good reception while using the MS in various positions such as while lying down, for example. In a field containing elliptical polarization, the strength of reception is not uniform but is a function of the position of the MS. Therefore, the angle at which the best reception is achieved may be skewed.

Figure 4:
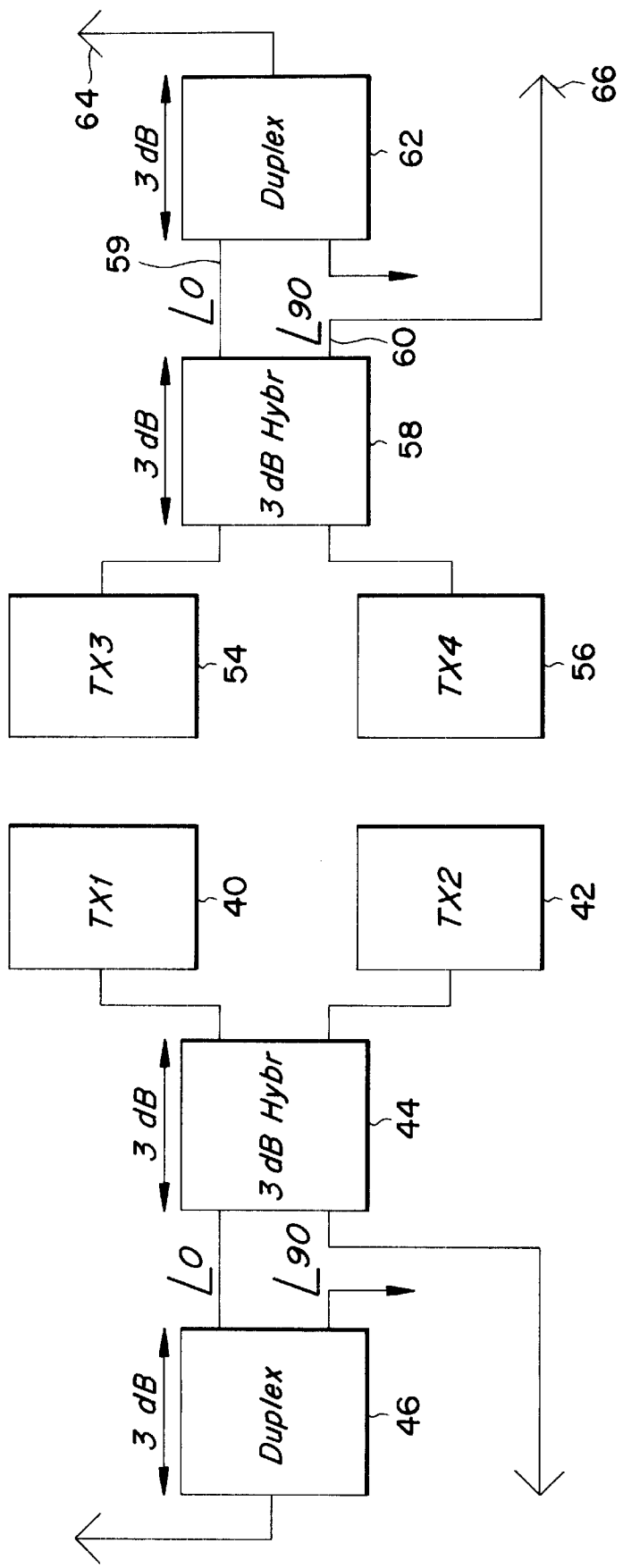
FIG. 4 is a functional block diagram of a base station in accordance with a second embodiment of the present invention.

FIG. 4 shows a simplified functional block diagram of a second embodiment in accordance with the present invention. Increased carrier (channel) capacity is achieved by the addition of transmitters TX3 54 and TX4 56 to the RBS of FIG. 3. Any number of transmitters may be added to the system to increase channel capacity. Transmitters TX1, TX2, TX3 and TX4 operate at distinct frequencies thereby providing the RBS with a four-carrier transmitting capability. In similar fashion to FIG. 3, the outputs of TX3 54 and TX4 56 are combined in hybrid combiner 58. Similarly, the outputs of combiner 58 are comprised of components 59 and 60 which are phase shifted 90° relative to each other. Component 59 is routed through duplex filter 62 and then to dipole antenna 64 to be emitted with a vertically polarized orientation. The component 60 is sent to horizontal antenna 66 for transmission having horizontal polarization. Both of the radiated components combine in the air to form a substantially circular polarized field in the area of coverage. It should be noted that a theoretically perfect circular polarized field is not attainable in practice, therefore some variation of the signal that is substantially circular is transmitted as a result. Circular polarization provides a form of transmitting diversity that improves reception at the MS handset for the aforementioned reasons.

In the embodiments described above, separate antennas were shown for transmitting the vertical and horizontal polarized signals respectively. In practice, a preferred embodiment may include a patch antenna that can be used in place of, or in conjunction with, a dipole antenna. Patch antennas, generally used in low powered devices, are known to those skilled in the art as having desirable properties and field emitting characteristics. By way of example, patch antennas can be formed from a flat rectangular piece of metal which can be relatively tiny. Tiny antennas facilitate their incorporation into small base stations to form a functional unit with no separate antennas to mount. When used with a backing plate, patch antennas exhibit directional field emitting characteristics. The field radiates from one side of the antenna only i.e. the base station can emit a field directly in front of it but not behind it. This situation may be very desirable in the operation of indoor base stations. For example, a small indoor base station emitting a circular polarized field with a patch antenna may be mounted against the inside wall of a building. This permits coverage throughout a room but not outside the building or into an adjacent room behind it. In contrast, a base station with a dipole antenna emits a radial field such that it must be positioned in the center of the room for similar coverage. This may be undesirable since mounting a base station in the center of a room may be more conspicuous and/or less convenient.

As described above, power dissipation of the RBS is reduced in the present invention by transmitting both output signals emerging from the combiner whereas, in the prior art, one signal is terminated and radiated away as heat. In turn, the amount of heat dissipation required necessitates a relatively sizable heat sink that affects the size of the base station. By way of example, in the prior art (FIG. 2), to achieve 100 mW of radiated power at the antenna, 400 mW must be supplied to each transmitter TX1 and TX2. Accordingly, 400 mW is fed in matching load 24 to be dissipated. A similar transmission output of 100 mW can be attained using the disclosed inventive concept by radiating, for example, a 33 mW vertically polarized and 67 mW horizontally polarized signal, thereby requiring approximately 133 mW from each transmitter. It follows that power dissipation is substantially reduced and the size of the heat sink required may be dramatically reduced. It should be noted that the unequal magnitudes of the signals are a result of losses incurred in the duplex filter which will therefore produce an elliptically polarized field. A circular polarized field may be achieved by introducing a band-pass filter, for example, in the horizontal antenna path to equalize the magnitudes but will result in less than 100 mW total output power. To achieve a 100 mW circular polarized field, the output power of the transmitters is increased but will remain well below that of the prior art.

Figure 5:
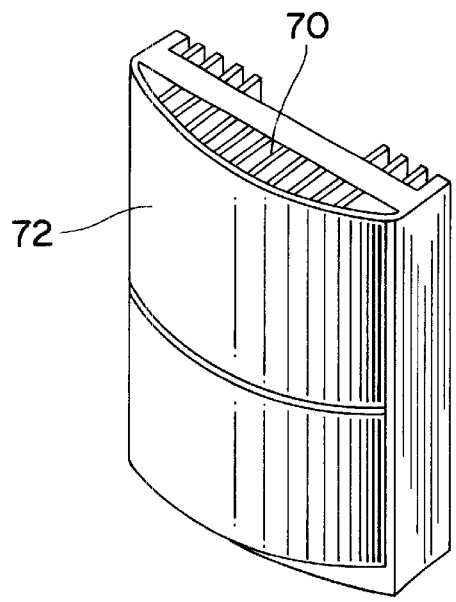
FIG. 5 is a perspective view of an indoor base station in accordance with the present invention.

FIG. 5 is a perspective view of a low heat-dissipating, reduced-size indoor radio base station constructed in accordance with the present invention. The relatively small fins 70 are conveniently hidden behind housing 72 for an inconspicuous, aesthetically pleasant appearance. Further, the unitary construction provides access to an array of simplified installation options. For example, the unit may be positioned on a wall, support column, girding, or even ceiling for concealed, unobtrusive mounting that is both economical and efficient.

Although the invention has been described in some respects with reference to specified preferred embodiments thereof, variations and modifications will become apparent to those skilled in the art. In particular, additional transmitters may be added in accordance with the inventive concept to obtain supplemental calling capacity. Further, the disclosure is not limited to indoor use since the embodiments can easily be adapted to a weatherproof cabinet for use outdoors. It is therefore, the intention that the following claims not be given a restrictive interpretation but should be viewed to encompass variations and modifications that are derived from the inventive subject matter disclosed.

What is claimed is:

1. A radio base station for use with a wireless telecommunication system comprising:

a first transmitter for transmitting a first transmitter signal;

a second transmitter for transmitting a second transmitter signal;

a combiner including at least two input ports coupled to the first transmitter and the second transmitter for combining said first and second transmitter signals, wherein said combiner generates a first output combiner signal and a second output combiner signal having a phase shift of 90° with respect to each other; and a first antenna and a second antenna oriented perpendicularly to each other and coupled to the combiner and configured for simultaneously transmitting said first and second output combiner signals through the first antenna and the second antenna respectively such that the emitted signals form a substantially circular polarized field such that said first and second output combiner signals are transmitted with reduced waste energy.

2. A radio base station as recited in claim 1 wherein said combiner is a hybrid combiner.

3. A radio base station as recited in claim 2 wherein a duplex filter is coupled between the hybrid combiner and the at least one antenna.

4. A radio base station as recited in claim 3 wherein said first antenna and second antenna are oriented as a vertical antenna and a horizontal antenna.

5. A radio base station as recited in claim 3 wherein said first antenna and said second antenna is a patch antenna.

6. A radio base station as recited in claim 5 wherein said first and second output combiner signals are emitted from the patch antenna having vertical and horizontal polarized orientations respectively.

7. A radio base station as recited in claim 1 wherein the substantially circular polarized field is elliptically polarized.

8. A radio base station as recited in claim 1 is housed in a weatherproof cabinet for outdoor use.

9. A radio base station as recited in claim 1 wherein additional transmitters are included for increased channel capacity.

10. A method of transmitting signals from a radio base station for use in a cellular telecommunication network, comprising the steps of:

combining a plurality of transmitter output signals with a combiner said combiner including at least two input ports for receiving said plurality of transmitter output signals;

generating first and second combiner output signals using said signals received on said at least two input ports with the combiner, wherein a relative phase shift of 90° is introduced between the signals; and transmitting the first and second combiner output signals simultaneously through a first antenna and a second antenna perpendicularly oriented to each other such that one signal is transmitted with vertical polarization and the other signal with horizontal polarization to produce a substantially circular polarized field, wherein the transmission of the first and second combiner signals represents a substantial majority of signal energy from said plurality of transmitter output signals that is ultimately transmitted thereby reducing the amount of power dissipation in the base station.

11. A method as recited in claim 10 wherein said combining is performed with a hybrid combiner.

12. A method as recited in claim 10 wherein said first and second combiner output signals are transmitted through a vertical antenna and a horizontal antenna.

13. A method as recited in claim 10 wherein said first and second antennas are comprised of a patch antenna.

14. A method as recited in claim 13 wherein the radio base station transmits as said substantially circular polarized field an elliptically polarized field by varying at least one of the magnitude and phase of the first and second combiner output signals.

15. A method as recited in claim 10 wherein said power dissipation is removed by a heat sink.

* * * * *